United States Patent
Takekata et al.

(10) Patent No.: US 6,237,957 B1
(45) Date of Patent: May 29, 2001

(54) REINFORCING FRAME FOR A WORKING VEHICLE

(75) Inventors: Mitsuhiro Takekata; Akifumi Nishino, both of Sakai; Kiyokazu Nakanishi, Kawachinagano; Toshiyuki Hamamoto, Sakai, all of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/174,973

(22) Filed: Oct. 19, 1998

(30) Foreign Application Priority Data

May 20, 1998 (JP) .................................................. 10-138491

(51) Int. Cl.[7] ............................. B62D 21/00; A01D 34/64
(52) U.S. Cl. .......................... 280/781; 180/900; 296/204; 56/15.9; 56/DIG. 22
(58) Field of Search ...................................... 180/900, 311; 280/781, 785; 269/188, 194, 195, 203.01, 204, 203.02, 203.03, 203.04; 56/DIG. 22, 15.8, 15.9

(56) References Cited

U.S. PATENT DOCUMENTS

| 4,737,067 | * | 4/1988 | Samejima et al. | 52/DIG. 22 |
| 5,123,805 |   | 6/1992 | Ishimori et al. | 414/686 |

FOREIGN PATENT DOCUMENTS

| 58-62227 | * | 4/1983 | (JP) . |
| 61-37086 |   | 3/1986 | (JP) . |
| 63-156240 |   | 10/1988 | (JP) . |
| 9-20265 | * | 1/1997 | (JP) . |

* cited by examiner

Primary Examiner—Paul N. Dickson
(74) Attorney, Agent, or Firm—Webb Ziesenheim Logsdon Orkin & Hanson, P.C.

(57) ABSTRACT

A tractor having an engine disposed in a front position, a transmission case disposed in a rear position, and a main frame for interconnecting the engine and transmission case. Reinforcing frames are attached to opposite side surfaces of the main frame. The reinforcing frames are shaped to accommodate a mid-mount mower.

21 Claims, 8 Drawing Sheets

REINFORCING FRAME FOR A WORKING VEHICLE

BACKGROUND OF THE INVENTION

1. Field of the Invention

This invention relates to a tractor having reinforcing frames.

2. Description of the Related Art

A small or medium size tractor is designed basically for engaging in operations with a working implement such as a rotary plow connected to the rear of a tractor body. It is sometimes desired today to attach a front loader or a mid-mount mower to achieve an increased range of operation. For attaching a front loader, however, the tractor body must be reinforced since the tractor body undergoes loads different from those encountered in ordinary operations. As disclosed in Japanese Utility Model Laying-Open Publications S61-37086 and S63-156240, for example, a tractor body is reinforced by connecting reinforcing frames extending longitudinally thereof. A front loader is attached to the reinforce frames.

The body strength may be increased by connecting the reinforcing frames extending longitudinally of the tractor body. Thus, the tractor body can fully withstand loads acting thereon during operations with the front loader in particular. Usually, the reinforcing frames for increasing the body strength of the tractor are disposed below a principal portion of the tractor body. For attaching a mid-mount mower between front and rear wheels, the reinforcing frames are obstructive and have to be detached.

SUMMARY OF THE INVENTION

A primary object of this invention is to provide a tractor having reinforcing frames for allowing a mid-mount mower to be attached between front and rear wheels.

Another object of this invention is to provide a tractor having lightweight reinforcing frames and capable of attaching a mower.

A further object of this invention is to provide a tractor having reinforcing frames for equally allowing a front loader and a mower to be attached.

The above objects are fulfilled, according to this invention, by a tractor comprising an engine disposed in a front position of the tractor, a rear housing disposed in a rear position of the tractor and having at least one of a transmission case and a differential case, a main frame interconnecting the engine and the rear housing, a mower disposed between front wheels and rear wheels of the tractor to be movable between an operative position in contact with the grounded and inoperative position raised from the ground, and a pair of reinforcing frames formed separately from the main frame, extending longitudinally of the tractor, and fixed to the tractor at opposite sides of the main frame. Each of the reinforcing frames has an upper surface adjacent the rear housing located below a bottom of the rear housing. Each of the reinforcing frames is shaped to accommodate the mower in the inoperative position.

The above tractor has the reinforcing frames capable of accommodating the mower.

In a preferred embodiment of the invention, the reinforcing frames comprise plate-like frames. With this construction, the tractor has lightweight reinforcing frames for accommodating the mower.

In an embodiment of this invention, the reinforcing frames include a loader mount. With this construction, the tractor has the reinforcing frames for attaching both the mower and a front loader.

DETAILED DESCRIPTION OF THE PREFERRED EMBODIMENT

Figure 1:
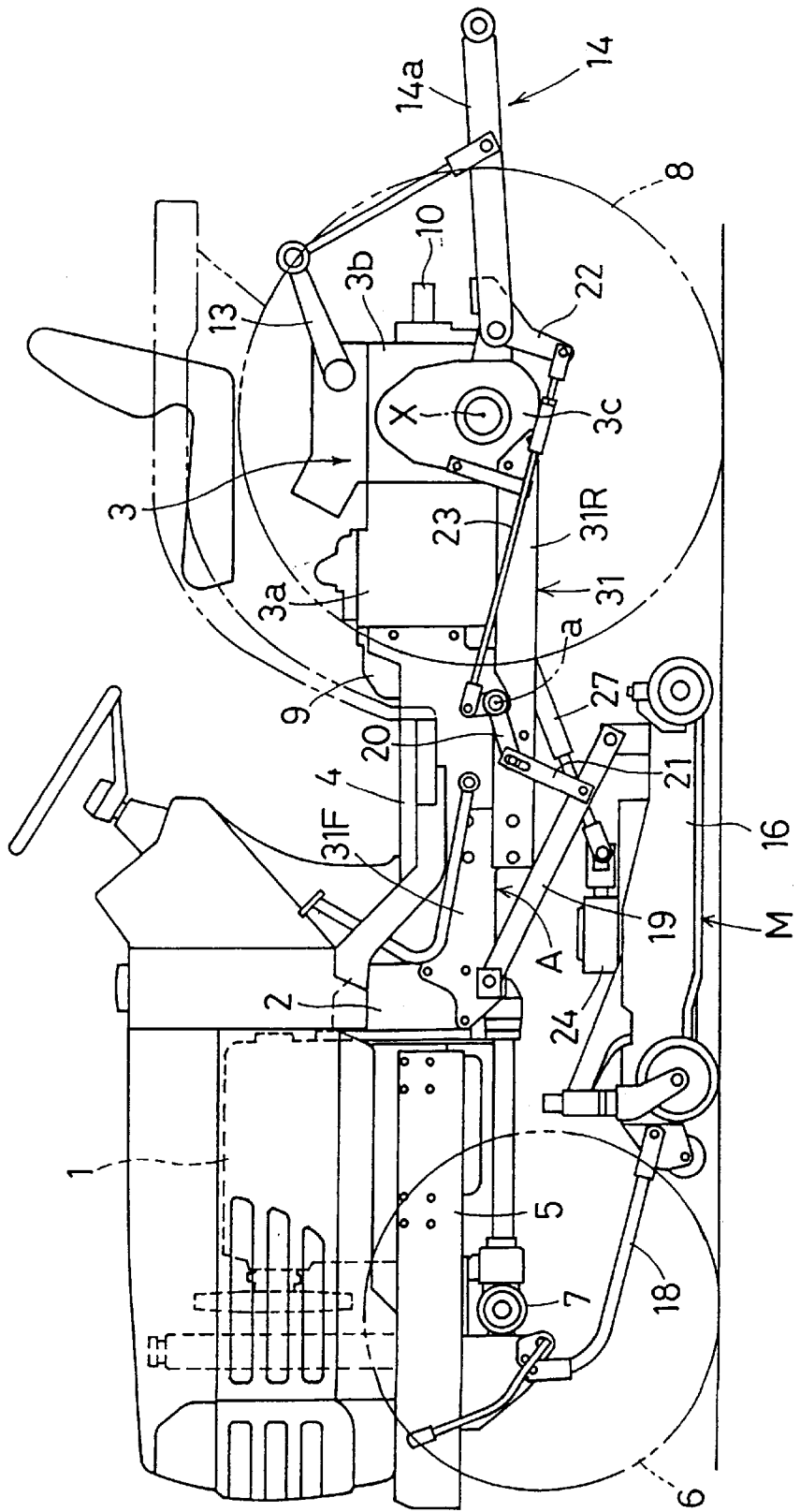
FIG. 1 is a side elevation of a tractor having reinforcing frames according to this invention and a mid-mount mower.
Figure 2:
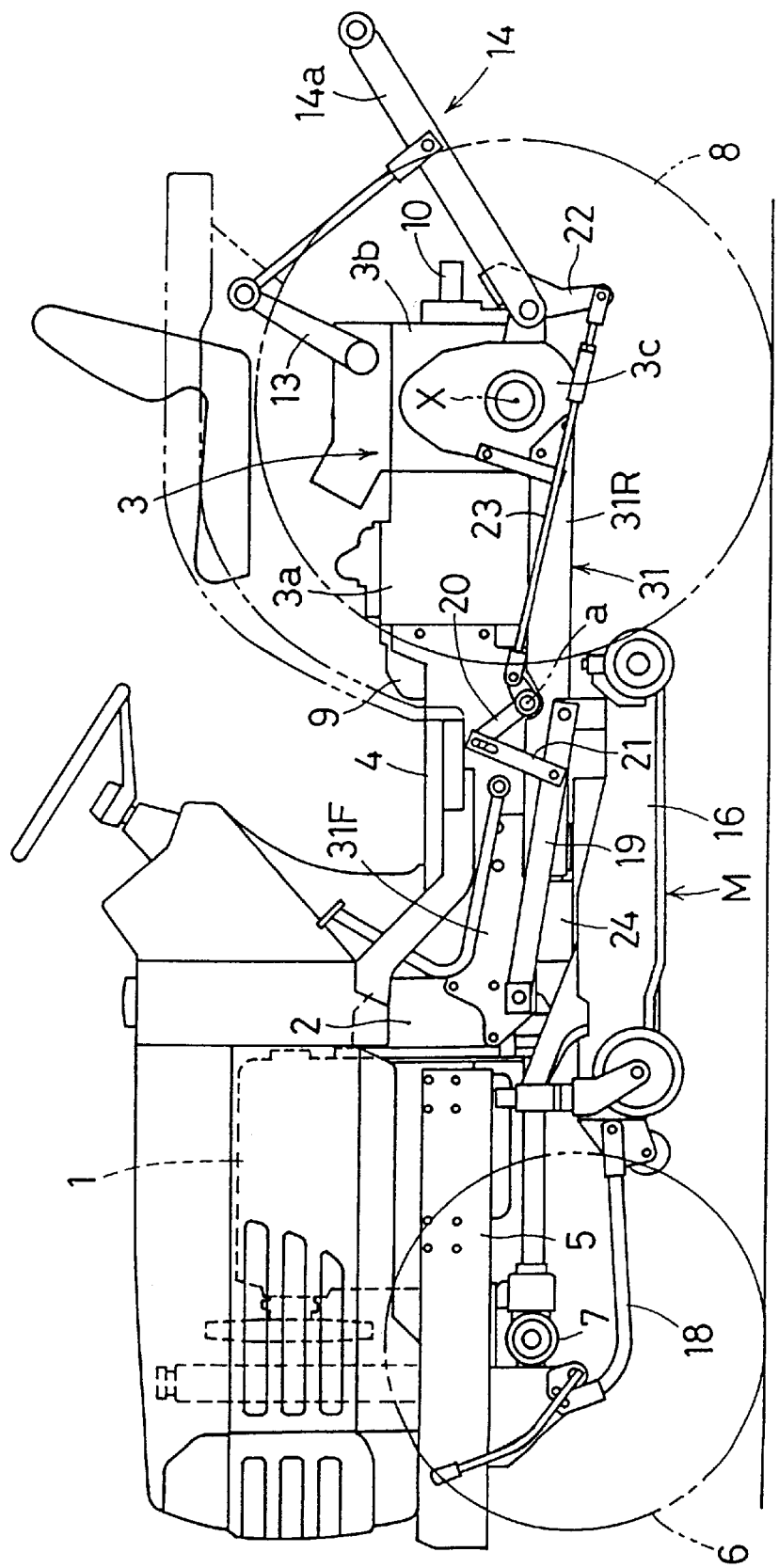
FIG. 2 is a side elevation showing the mower raised to an upper limit.

FIGS. 1 and 2 show a side elevation of a tractor according to this invention. This tractor includes an engine 1 mounted on a front portion of a tractor body, and a main clutch housing 2 coupled to the rear end of engine 1. A rear housing 3 disposed in a rear portion of the tractor body is coupled to the main clutch housing 2 through a main frame 4 formed of sheet metal to constitute a principal portion of the tractor body. The tractor is a four wheel drive tractor with dirigible front wheels 6 supported by a front axle case 7 supported for rolling relative to a front frame 5 attached to the engine 1, and rear wheels 8 supported by the rear housing 3.

Figure 6:
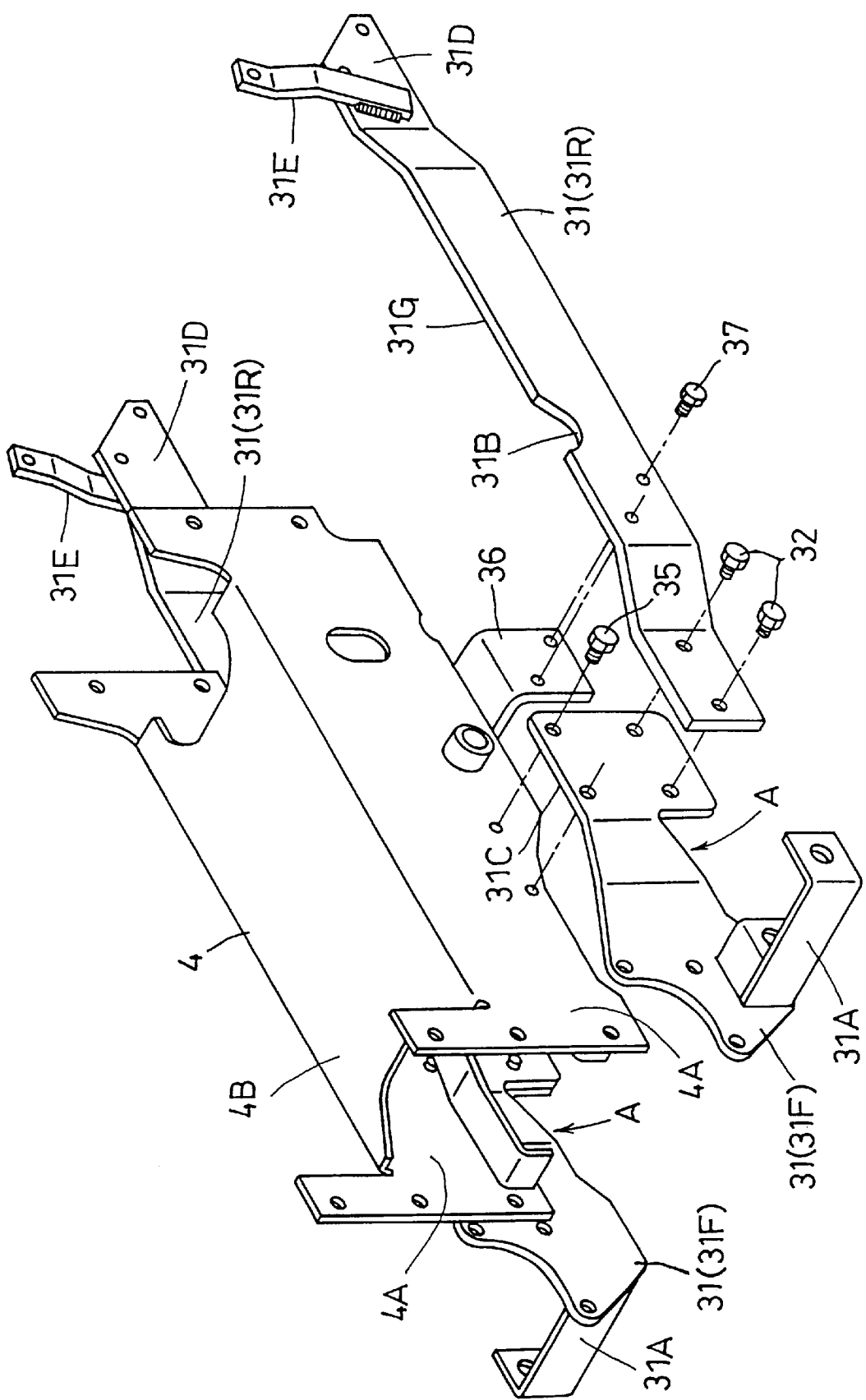
FIG. 6 is an exploded perspective view of the reinforcing frames.

As best seen from FIG. 6, the main frame 4 has a pair of vertical side surfaces 4A and an upper surface 4B interconnecting upper ends of vertical side surfaces 4A.

Figure 3:
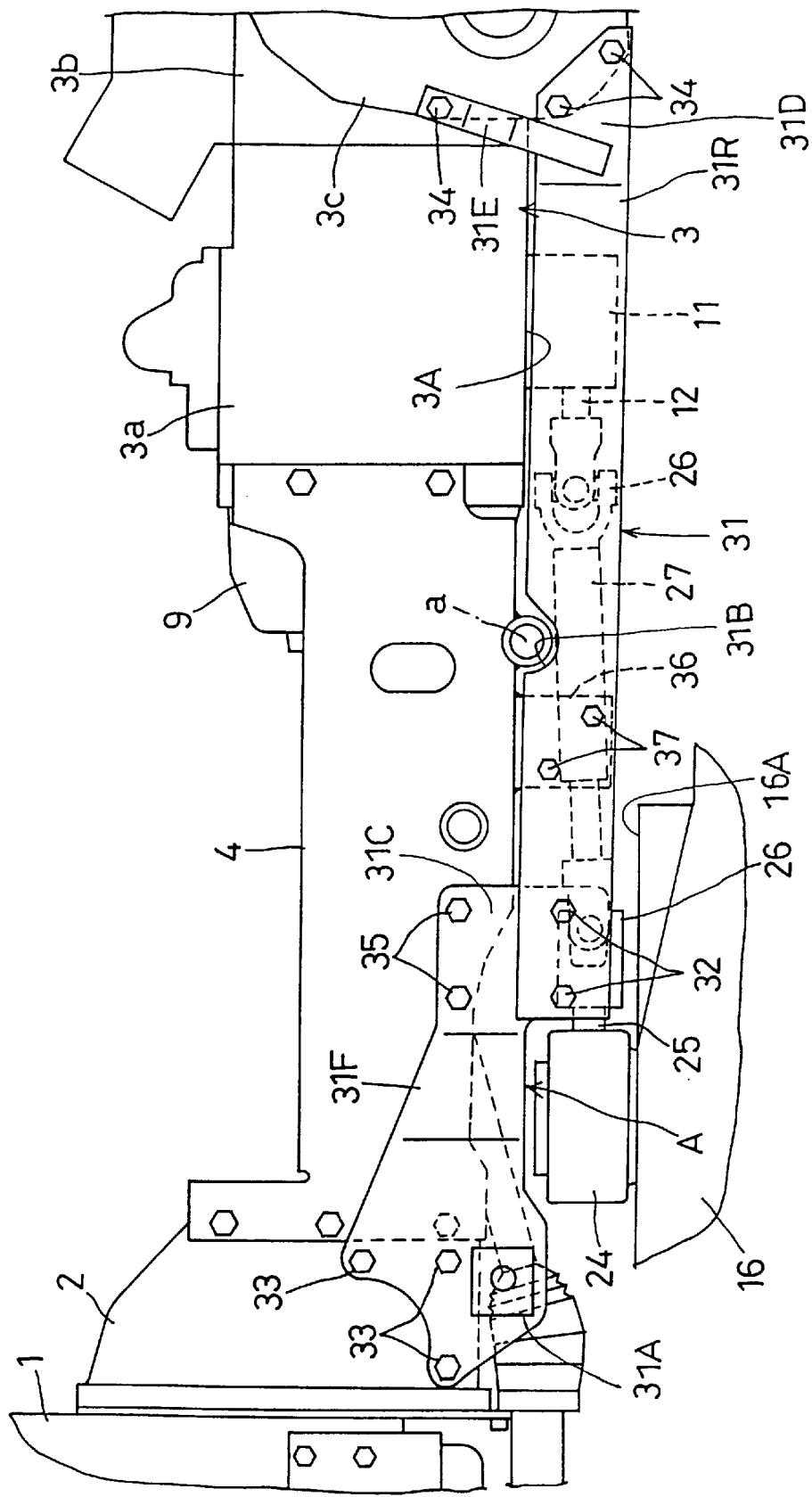
FIG. 3 is a side view showing attachment of the reinforcing frames.

As shown in FIG. 3, the rear housing 3 includes a transmission case 3a containing a gear transmission, and a differential case 3b supporting the rear wheels 8. Engine power is transmitted to a hydrostatic stepless transmission (HST) attached to a front surface of transmission case 3a is equipped. The power, after speed changing by the HST, receives a further speed changing by the gears in the transmission case 3. Then, the power is transmitted to the right and left rear wheels 8 through a differential (not shown) mounted in the differential case 3b. The power is also transmitted through shafts to the front axle case 7 to drive the front wheels 6.

As shown in FIGS. 1 and 2, part of the engine power is branched from the propelling line and outputted from a rear PTO shaft 10 projecting from the rear end of rear housing 3. The power is also outputted to a mid-power takeoff shaft 12 in an output case 11 projecting downward from the bottom of transmission case 3.

The tractor further includes, attached to the rear of the tractor body, lift arms 13 driven by hydraulic pressure, and a three-point link mechanism 14 vertically movable by the lift arms 13. A working implement is coupled to the link mechanism 14 to be vertically movable.

Figure 5:
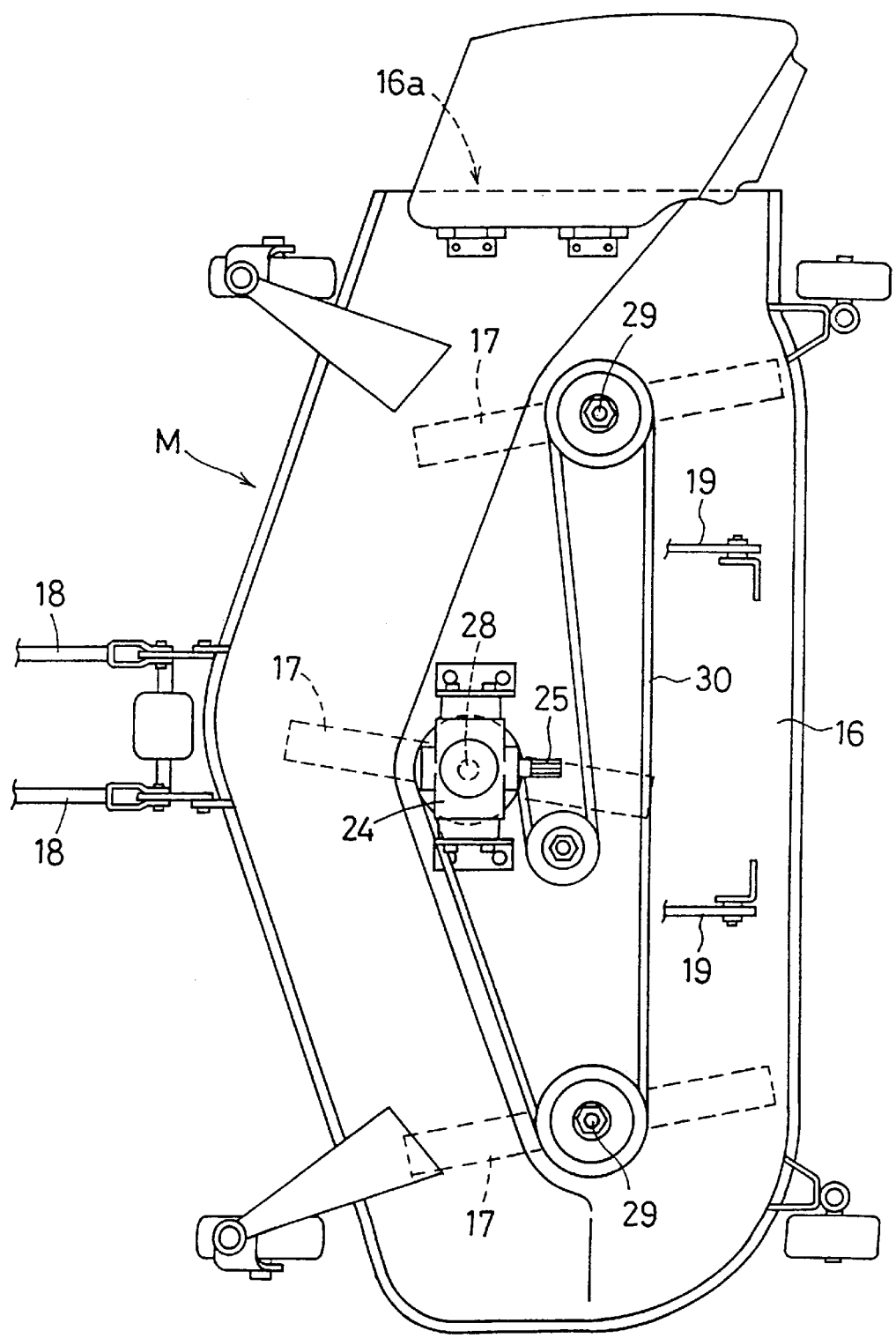
FIG. 5 is a plan view of the mower.

A mid-mount mower M is disposed between the front wheels 6 and rear wheels 8. As shown in FIG. 5, the mower M includes a deck 16 housing three blades 17 juxtaposed therein to be rotatable about vertical axes. The blades 17 are rotatable clockwise in plan view to cut grass. Grass clippings are discharged from an outlet 16a disposed at a right end of deck 16. The mower M is suspended through front links 18 and rear links 19 to be vertically movable in parallel. The mower M is suspended, also through suspender links 21, from lift arms 20 attached to right and left sides of the tractor body about to be pivotable about an axis a. The lift arms 20 are operatively connected through rods 23 to metal pieces 22 coupled to lower links 14a of the three-point link mechanism 14. When the three-point link mechanism 14 is raised, the lift arms 20 are swung upward to raise the mower M. That is, the mower M is movable between an operative position engaging the ground and an inoperative position raised from the ground.

Figure 4:
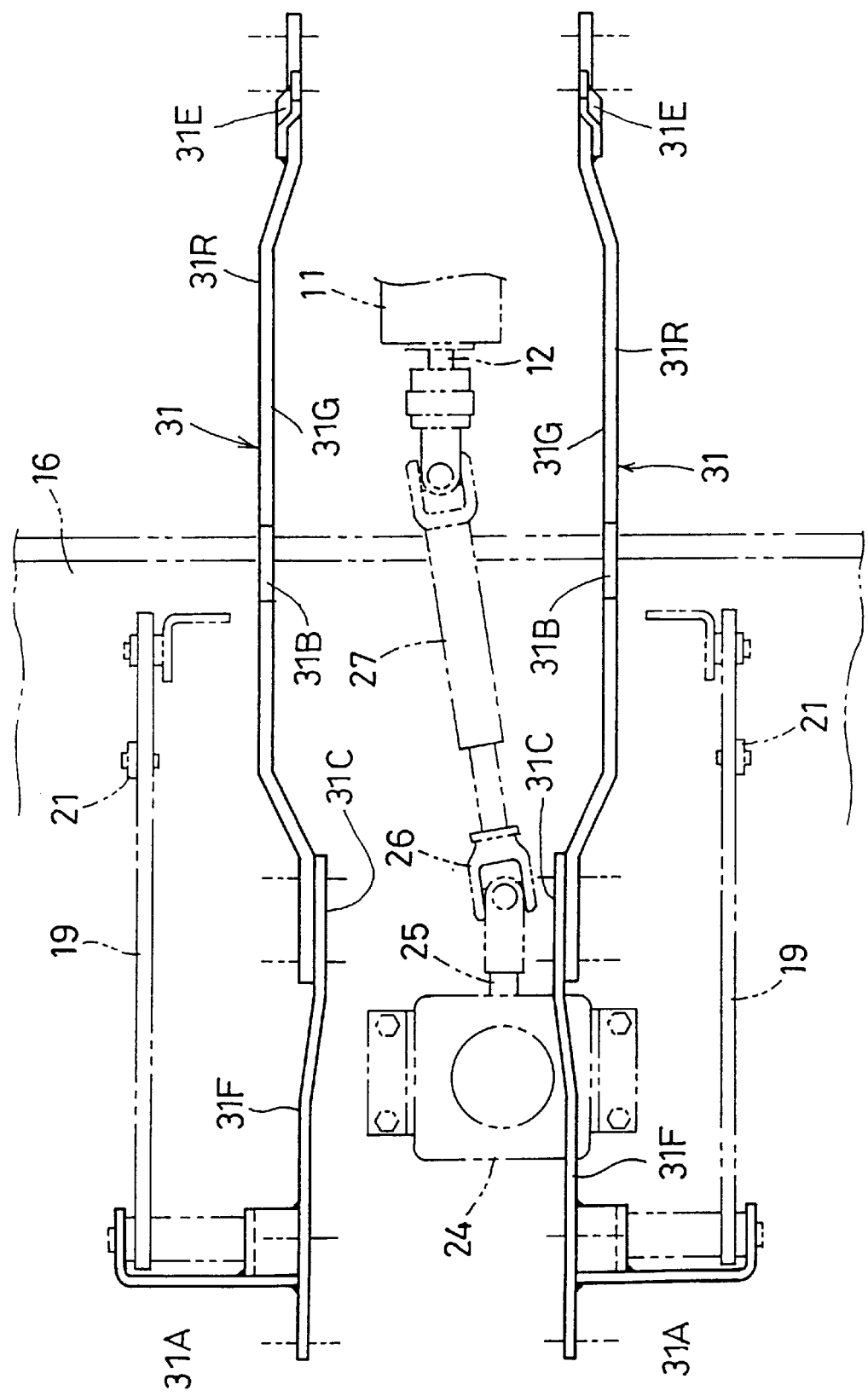
FIG. 4 is a plan view of the reinforcing frames.

An input case 24 containing a bevel gear transmission mechanism is mounted on an upper surface of the deck 16 to be coaxial with the center blade 17. As shown in FIGS. 3 and 4, the input case 24 has an input shaft 25 projecting rearward therefrom and operatively connected to the mid-power takeoff shaft 12 through a pair of front and rear universal joints 26 and a transmission shaft 27. A center blade drive shaft 28 which is the output shaft of input case 24 and drive shafts 29 of right and left blades 17 are interlocked through a belt 30 wound therearound, whereby all the blades 17 are rotatable in the same direction.

The tractor body constructed as described above has elongate reinforcing frames 31 attached to right and left sides thereof and extending longitudinally from the main clutch housing 2 to the rear housing 3. As shown in FIG. 6, the reinforcing frames 31 are in the form of thick plates disposed in vertical posture, and dividable into front reinforcing frame parts 31F and rear reinforcing frame parts 31R.

As seen from FIGS. 1 and 2, forward ends of front reinforcing frame parts 31F in this embodiment are located rearwardly of the front end of main clutch housing 2. Rear ends of rear reinforcing frame parts 31R are located forwardly of the axis X of the rear wheel axles.

As best seen from FIG. 3, a connection 31C at a rear end of each front reinforcing frame part 31F and a forward end of each rear reinforcing frame part 31R are coupled to each other by two bolts 32. Consequently, the connection 31C partly overlaps the rear reinforcing frame part 31R in side view.

The forward end of each front reinforcing frame part 31F is coupled to a side of main clutch housing 2 by three bolts 33. A rear end 31D of each rear reinforcing frame part 31R is coupled to a connection between the differential case 3b and reduction case 3c of the rear housing 3 by three bolts 34. The rear end 31D of each rear reinforcing frame part 31R includes a projection 31E projecting upward for attached to the tractor.

The connection 31C of each front reinforcing frame part 31F is coupled to a side of main frame 4 by two bolts 35. The forward end of each rear reinforcing frame part 31R is coupled to a support metal piece 36 projecting from the main frame 4 by two bolts 37. Each rear reinforcing frame part 31R defines a recess 31B to avoid interference with a support shaft of lift arm 20.

As seen from FIG. 6, the forward end of each front reinforcing frame part 31F has a connector 31A projecting sideways for pivotably supporting the rear link 19.

As shown in FIG. 3, each rear reinforcing frame part 31R is located between the bottom 3A of rear housing 3 and the upper surface 16A of deck 16 of mower M in an upper limit position which is the inoperative position. Further, each rear reinforcing frame part 31R has a lower end thereof located slightly below or level with a lower end of output case 11 having the mid-power takeoff shaft 12. Each rear reinforcing frame part 31R positioned in this way is effective to protect components such as the output cases 11 and mid-power takeoff shaft 12.

Each front reinforcing frame part 31F defines a downward facing stepped portion A forwardly of the connection 31C to the rear reinforcing frame part 31R. When the mower M is raised to the uppermost inoperative position, the input case 24 projecting from the upper surface of deck 16 is received in the stepped portion A. When the tractor makes a U-turn during a grass cutting operation, the mower M generally turns about an end thereof opposite from the discharge opening. In order to leave little uncut grass when making such a turn, the mower M itself is coupled to the tractor body as offset to the center of U-turn, i.e. to the side opposite from the discharge opening (leftward in the illustrated example). Consequently, the input case 24 is offset leftward from the transversely middle position of the tractor body, so that the input case 24 is located under the left reinforcing frame 31. By forming the stepped portion A as described above, the mower M may be raised to a sufficient height without the input case 24 interfering with the reinforcing frame 31.

Each rear reinforcing frame part 31R of the reinforcing frames 31 includes a bulge 31G protruding laterally outward in plan view to have a slightly increased spacing from the tractor body. This configuration allows components to be attached laterally of the tractor body. With an increased spacing between the right and left reinforcing frames 31, no interference occurs with structures projecting upward from the mower. These frames 31 have a greater rigidity against sideways loads than straight frames. With increased spaces between outer surfaces of the transmission case and the reinforcing frames 31 in plan view, accessories may be attached to the outer surface of the transmission case with ease.

When the mower M is raised to the upper limit, the rear reinforcing frame parts 31R are located laterally of the transmission shaft 27 operatively interconnecting the mid-power takeoff shaft 12 and the input shaft 25 of mower M to conceal these shafts. That is, in side view shown in FIG. 3, each rear reinforcing frame part 31R overlaps the transmission shaft 27.

Figure 8:
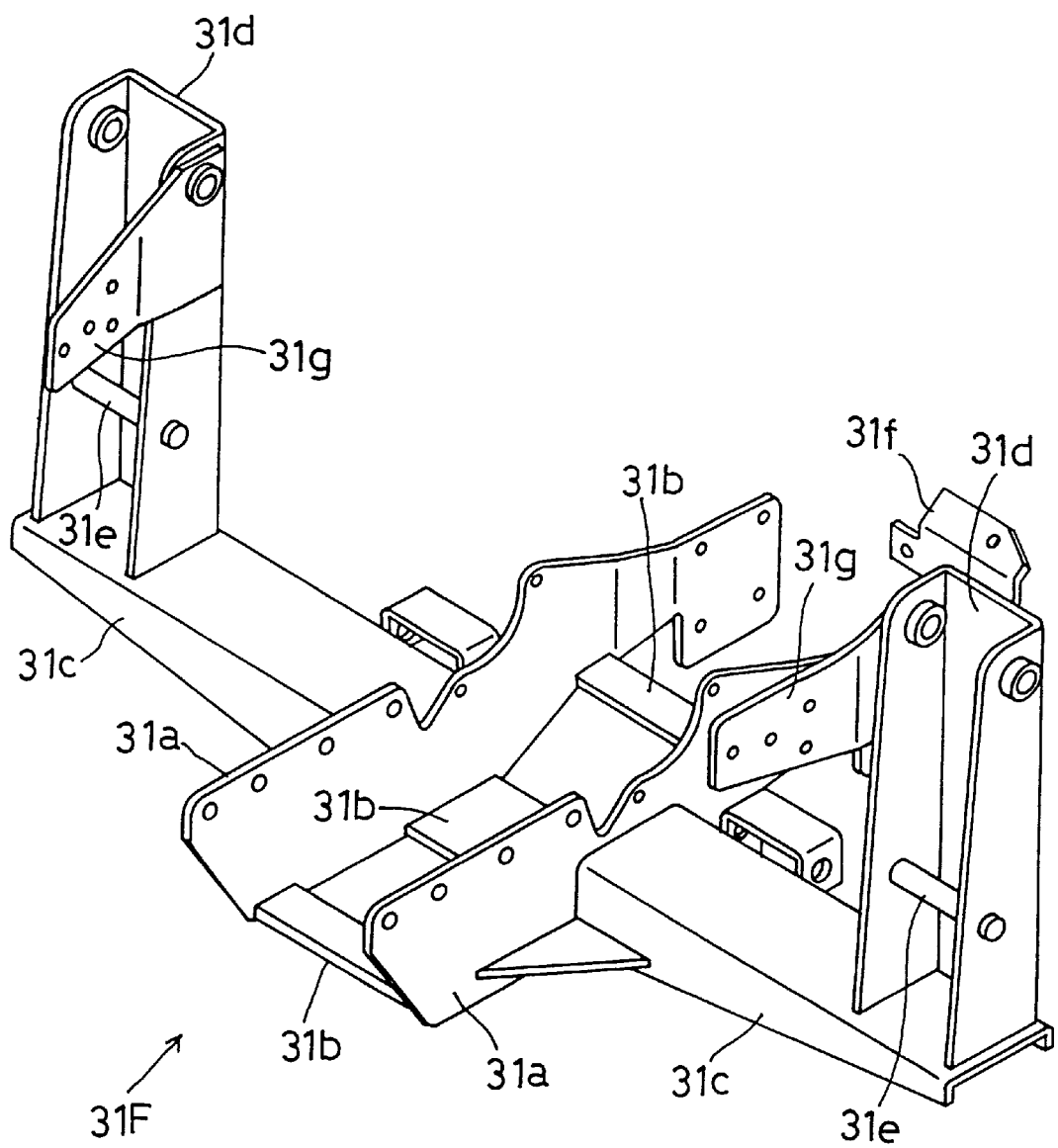
FIG. 8 is a perspective view of the reinforcing frames designed for attaching the loader.

The front reinforcing frame parts 31F of the reinforcing frames 31 shown in FIG. 6 are of a standard design, which are replaceable with a frame part 31F shown in FIG. 8 which is designed for attaching a loader.

Figure 7:
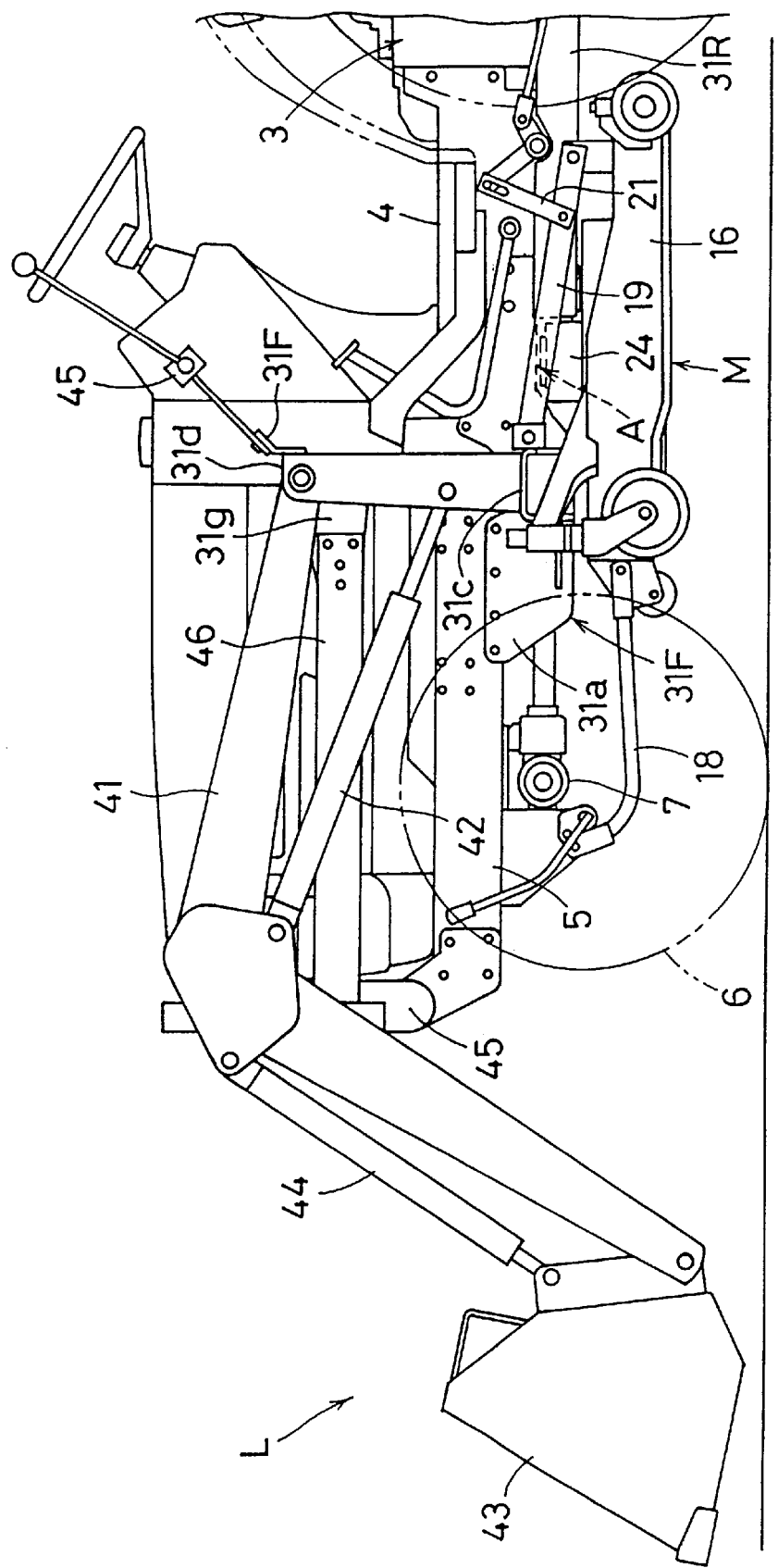
FIG. 7 is a side elevation of the tractor with a reinforcing frames having a loader mount, and having a front loader and the mid-mount mower attached.

As shown in FIG. 8, the front reinforcing frame part 31F designed for attaching a loader includes a pair of right and left base plates 31a to extend along the sides of the tractor body, a plurality of stays 31b arranged in the fore and aft direction to interconnect the base plates 31a, arms 31c projecting sideways as cantilevers from longitudinally intermediate positions of the base plates 31a, and posts 31d erected from free ends of the respective arms 31c. As shown in FIG. 7, the rear end of each base plate 31a is bolted to the forward end of rear reinforcing frame part 31R and to the tractor body as is each front reinforcing frame part 31F of the standard design. A forward portion of each base plate 31a is bolted to side surfaces of the main clutch housing 2 and engine 1. The arms 31c and posts 31d are called a loader mount.

Proximal ends of a pair of right and left arms 41 of a front loader L are pivotally coupled to upper ends of posts 31d. A proximal end of a lift cylinder 42 is pivotally coupled to a pivotal axis 31e disposed in a vertically intermediate position of one of the posts 31d. A control valve 45 is mounted on a bracket 31f extending upward and rearward from the upper end of one of the posts 31d, for controlling the lift cylinder 42 and a tilt cylinder 44 which swings a bucket 43 up and down. Further, a pair of right and left auxiliary frames 46 formed of plates are coupled between brackets 31g extending forward from the respective posts 31d and an arched reinforce frame 45 attached to the forward end of front frame 5, to sufficiently withstand loads acting in the fore and aft direction on the posts 31d.

Also when the front reinforcing frame part 31F of the loader attaching design is used, downward facing stepped portions A are formed forwardly of the connections to the rear reinforcing frame parts 31R. Thus the mower M may be raised to a good height.

Instead of the stepped portions A, downwardly facing cutouts may be formed to avoid interference between the input case 24 of mower M in the raised position and the reinforcing frames 31.

What is claimed is:

1. A tractor comprising:
    an engine disposed in a front position of said tractor;
    a rear housings disposed in a rear position of said tractor and having at least one of a transmission case and a differential case;
    a main frame interconnecting said engine and said rear housing;
    a mower disposed between front wheels and rear wheels of said tractor to be movable between an operative position in contact with the ground and inoperative position raised from the ground; and
    a pair of reinforcing frames formed separately from said main frame, extending longitudinally of said tractor, and fixed to said tractor at opposite sides of said main frame, each of said reinforcing frames having an upper surface adjacent said rear housing located below a bottom of said rear housing, and each of said reinforcing frames being shaped to accommodate said mower in said inoperative position;
    wherein each of said reinforcing frames includes a front reinforcing frame part and a rear reinforcing frame part formed separately from said front reinforcing frame part,
    wherein the rear reinforcing frame part is disposed rearwardly of said front reinforcing frame part and coupled to said front reinforcing frame part, and
    wherein said front reinforcing frame part has a connection for coupling a link of said mower thereto.

2. A tractor as defined in claim 1, wherein said reinforcing frames are plates.

3. A tractor as defined in claim 1, wherein said rear housing is formed of both said transmission case and said differential case.

4. A tractor as defined in claim 1, further comprising a clutch housing disposed rearwardly of said engine, said reinforcing frames having forward ends thereof located rearwardly of a forward end of said clutch housing.

5. A tractor as defined in claim 1, wherein said reinforcing frames have rear ends thereof located forwardly of an axis of rear wheel axles.

6. A tractor as defined in claim 2, wherein said reinforcing frames have upper edges thereof defining recesses, respectively, to avoid interference with support shafts of lift arms.

7. A tractor as defined in claim 1, wherein said main frame has a pair of vertical side faces, and an upper surface interconnecting upper ends of said vertical side faces, said reinforcing frames being fixed to said vertical side faces, respectively.

8. A tractor as defined in claim 1, wherein said front reinforcing frame part h as a connection for coupling said rear reinforcing frame part thereto, said connection having a portion overlapping said rear reinforcing frame part in side view.

9. A tractor as defined in claim 8, wherein said front reinforcing frame part has a portion of a lower surface thereof displaced upward from a lower surface of said rear reinforcing frame part, said lower surface of said front reinforcing frame part defining a space for accommodating said mower.

10. A tractor as defined in claim 1, wherein said rear reinforcing frame part has a projection extending upward to be attached to said tractor.

11. A tractor as defined in claim 1, wherein said front reinforcing frame part includes a loader mount.

12. A tractor as defined in claim 11, wherein said loader mount has a pair of arms extending right and left, and posts erected on said arms, respectively.

13. A tractor as defined in claim 1, wherein each of said reinforcing frames has a portion bulging laterally outwardly of said tractor.

14. A tractor as defined in claim 1, wherein said rear reinforcing frame part has a lower end thereof substantially level with a lower end of an output case projecting downward from said rear housing and having a mid-power takeoff shaft.

15. A tractor as defined in claim 1, wherein said rear reinforcing frame part is positioned to overlap a mid-power takeoff shaft in side view.

16. A tractor comprising:
    an engine disposed in a front portion of said tractor;
    a rear housing disposed in a rear portion of said tractor and having at least one of a transmission case and a differential case;
    a main frame interconnecting said engine and said rear housing;
    a mower disposed between front wheels and rear wheels of said tractor to be movable between an operative position in contact with the ground and an inoperative position raised from the ground; and
    a pair of reinforcing frames formed separately from said main frame, extending longitudinally of said tractor, and fixed to said tractor at opposite sides of said main frame, each of said reinforcing frames having an upper surface adjacent said rear housing located below a bottom of said rear housing, and each of said reinforcing frames being shaped to accommodate said mower in said inoperative position,
    wherein each of said reinforcing frames includes a front reinforcing frame part, and a rear reinforcing frame part disposed rearwardly of and coupled to said front reinforcing frame part, and wherein said front reinforcing frame part has a connection for coupling a link of said mower thereto.

17. A tractor as defined in claim 14, wherein said rear reinforcing frame part is formed separately from said front reinforcing frame part.

18. A tractor comprising:

an engine disposed in a front portion of said tractor;

a rear housing disposed in a rear portion of said tractor and having at least one of a transmission case and a differential case;

a main frame interconnecting said engine and said rear housing;

a mower disposed between front wheels and rear wheels of said tractor to be movable between an operative position in contact with the ground and an inoperative position raised from the ground; and a pair of reinforcing frames formed separately from said main frame, extending longitudinally of said tractor, and fixed to said tractor at opposite sides of said main frame, each of said reinforcing frames having an upper surface adjacent said rear housing located below a bottom of said rear housing, wherein each of said reinforcing frames includes a front reinforcing frame part and a rear reinforcing frame part disposed rearwardly of and coupled to said front reinforcing frame part, and wherein said front reinforcing frame part defines a stepped portion forwardly of the connection between said front reinforcing frame part and said rear reinforcing frame part to accommodate said mower in said inoperative position.

19. A tractor as defined in claim 18, wherein said stepped portion is configured so as to avoid interference between an input case of said mower and each of said reinforcing frames.

20. A tractor as defined in claim 18, wherein said rear reinforcing frame part is formed separately from said front reinforcing frame part.

21. A tractor comprising:

an engine disposed in a front portion of said tractor;

a rear housing disposed in a rear portion of said tractor and having at least one of a transmission case and a differential case;

a main frame interconnecting said engine and said rear housing;

a mower disposed between front wheels and rear wheels of said tractor to be movable between an operative position in contact with the ground and an inoperative position raised from the ground; and a pair of reinforcing frames formed separately from said main frame, extending longitudinally of said tractor, and fixed to said tractor at opposite sides of said main frame, each of said reinforcing frames having an upper surface adjacent said rear housing located below a bottom of said rear housing, and each of said reinforcing frames being shaped to accommodate said mower in said inoperative position, wherein each of said frames defines a bulged portion below said transmission case and extending laterally of an output case of a transmission of the tractor, said bulged portion configured such that said pair of reinforcing frames has a lateral width adjacent said bulged portion larger than the lateral width of said transmission case, and wherein a front one of said reinforcing frames has a connection for coupling a link of said mower thereto.

\* \* \* \* \*

UNITED STATES PATENT AND TRADEMARK OFFICE
CERTIFICATE OF CORRECTION

PATENT NO.     : 6,237,957 B1                                           Page 1 of 1
DATED          : May 29, 2001
INVENTOR(S)    : Nitsuhiro Takekata et al.

It is certified that error appears in the above-identified patent and that said Letters Patent is hereby corrected as shown below:

Column 5, claim 1,
Line 23, "a rear housings" should read -- a rear housing --.

Column 6, claim 8,
Line 5, "h as" should read -- has --.

Signed and Sealed this

Nineteenth Day of February, 2002

Attest:

*Attesting Officer*

JAMES E. ROGAN
*Director of the United States Patent and Trademark Office*